Figure 1:
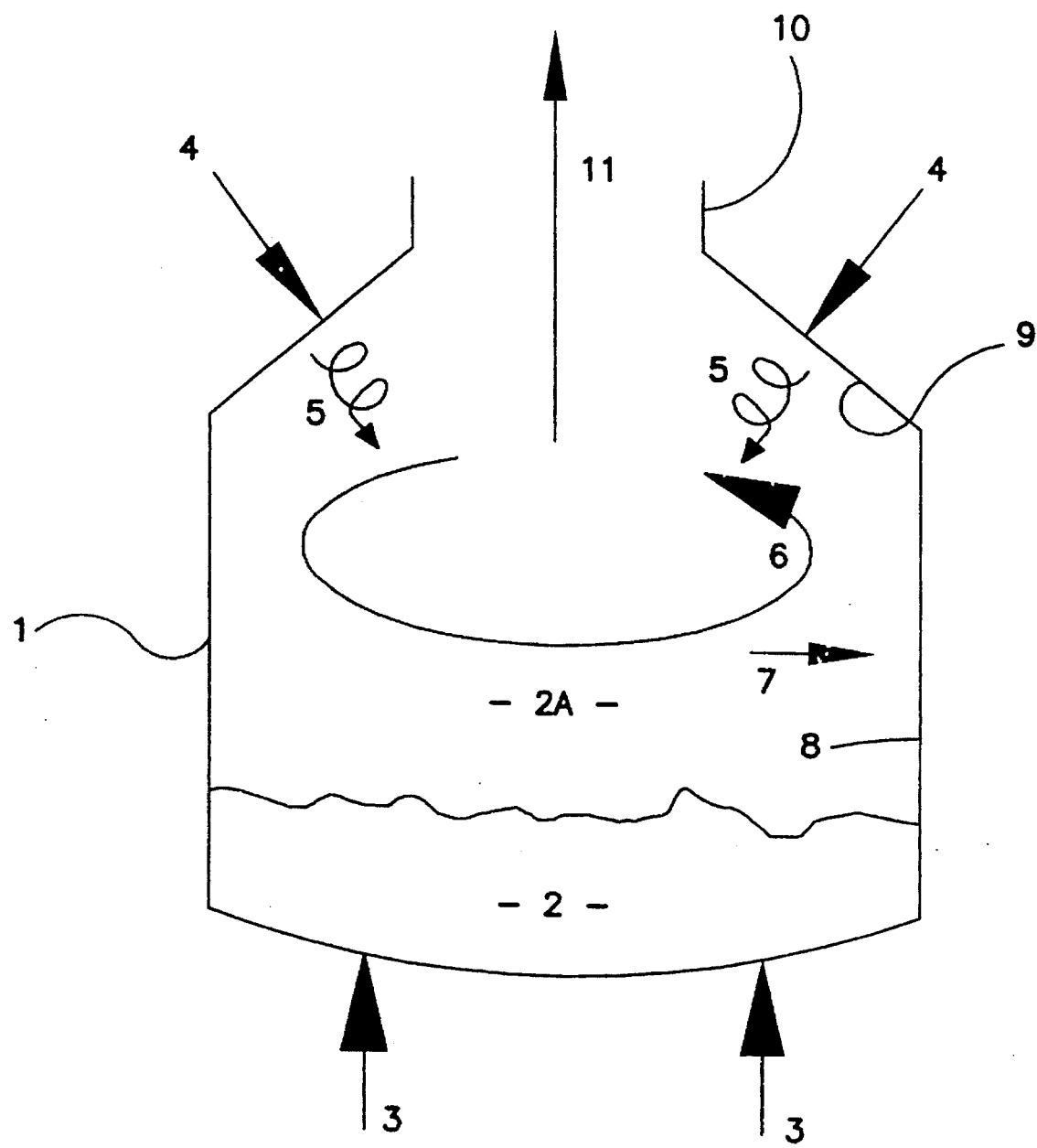

United States Patent

Keogh et al.

[11] Patent Number: 5,489,325
[45] Date of Patent: Feb. 6, 1996

[54] PROCESS FOR PRODUCING METALS AND METAL ALLOYS IN A SMELT REDUCTION VESSEL

[75] Inventors: John V. Keogh, Camberwell; Robin J. Batterham, Brighton; Barry S. Andrews, Glen Iris, all of Australia

[73] Assignee: CRA Services Ltd., Melbourne, Australia

[21] Appl. No.: 934,460

[22] PCT Filed: Mar. 13, 1991

[86] PCT No.: PCT/AU91/00089

§ 371 Date: Nov. 3, 1992

§ 102(e) Date: Nov. 3, 1992

[87] PCT Pub. No.: WO91/14005

PCT Pub. Date: Sep. 19, 1991

[30] Foreign Application Priority Data

Mar. 13, 1990 [AU] Australia ................. PJ9063

[51] Int. Cl.$^6$ .................................................. C21B 11/00
[52] U.S. Cl. .................... 75/443; 75/501; 75/502
[58] Field of Search ................. 75/501, 502, 443, 75/453; 266/144

[56] References Cited

U.S. PATENT DOCUMENTS 4,798,624  1/1989  Brotzmann et al. ............ 75/501
4,915,731  4/1990  Cooper ............................ 75/453
4,976,776  12/1990 Elvander et al. ................ 75/502
5,051,127  9/1991  Hardie et al. ................... 75/553

FOREIGN PATENT DOCUMENTS

23864/84  1/1984  Australia.
41064/85  4/1985  Australia.
22448/88  9/1988  Australia.
26831/88  12/1988 Australia.
42859/89  10/1989 Australia.
49309/90  2/1990  Australia.
49307/90  2/1990  Australia.

Primary Examiner—Melvyn Andrews
Attorney, Agent, or Firm—Merchant, Gould, Smith, Edell, Welter & Schmidt

[57] ABSTRACT

A process and a smelt reduction vessel (1) for producing metals and metal alloys, in particular iron and iron alloys, from metal oxides and ores in a smelt reduction vessel. The process and the vessel are characterized in that loss of liquid and solids with waste gases (11) from the vessel are minimized by causing the waste gases, oxidizing gases (5) and entrained liquid and solids in the space in the vessel that is above the molten metal to rotate about a vertical axis of the vessel thereby forcing liquid and solids outwardly toward the wall of the vessel. This rotational motion may be caused by injecting some or all of the oxidizing gases through tuyeres (4) positioned above the bath surface obliquely to a vertical plane through a vertical axis of the vessel. The vessel may have a substantially rotationally symmetrical shape at least in the space above the molten metal (2A).

9 Claims, 1 Drawing Sheet

PROCESS FOR PRODUCING METALS AND METAL ALLOYS IN A SMELT REDUCTION VESSEL

The present invention relates to a process for producing metals and metal alloys, in particular iron and iron alloys, from metal oxides and ores, such as iron ore, including partly prereduced ores and metal oxide-containing slags, in a smelt reduction vessel in which fine-grained solids, such as carbon, carbonaceous fuels, metal oxides, slag forming agents and/or mixtures thereof, and oxidizing gases, such as oxygen, air and oxygen-containing gases, are directed into the molten metal below and/or from above the bath surface, and to a smelt reduction vessel for advantageously carrying out this process.

In recent years a number of new processes have become known that relate to the production of iron and steel. These processes have in common that they replace blast furnace coke, which is relatively expensive, by all conventional qualities of coal and reduce iron ore either after a prereduction step or directly in an iron bath reactor.

Some of these new processes are made more economical by utilizing the afterburning of the reaction gases from the iron bath in the gas space of the iron bath reactor. Since only about one third of the calorific value of coal is available during its combustion to carbon monoxide in the iron bath, a maximum afterburning of the reaction gases CO and $H_2$ from the iron bath in the gas space thereabove is advantageous for the thermal efficiency of the process. However, the afterburning of the reaction gases involves the disadvantage that the resulting waste gases cannot be used for prereduction. European patent application no 01 26 391 overcomes this disadvantage by a composite process comprising, an ore prereduction step, e.g., a shaft furnace, and a melt-down gasifier, wherein the reaction gases escaping from the molten iron are at least partly afterburned, the resulting heat is largely transmitted to the melt, the reaction gases are then reduced by reducing agents on their way to the prereduction vessel, and are simultaneously cooled to an optimal reduction temperature.

German patent nos 36 07 774 and 36 07 775 deal with processes for smelt reduction of iron ore and are characterized by advantageous features for afterburning the reaction gases in a smelt reduction vessel. For example, the patents describe the use of hot air with a temperature of 800° C. to 1500° C. and multi-step afterburning.

German patent no 39 03 705 describes a process and a corresponding apparatus that made it possible for the first time to control afterburning selectively. The afterburning gas jet is blown onto the bath surface with a swirl, and the degree of afterburning can be varied by changing the swirl value.

While the new processes mentioned above are carried out in a specially shaped smelt reduction vessel, for example a kind of drum type reactor, there are also known processes that can be operated in conventional steelmaking converters such as LD vessels (BOF) or OBM/KMS converters with bottom tuyeres. On the basis of this technology smelt reduction processes have become known, for example, from Kobe Steel and Kawasaki in Japan and British Steel, Klockner-Werke and Krupp in Europe.

German patent no 36 07 776 deals with a problem common to all smelt reduction processes, namely how to treat the liquid and solids, e.g. iron droplets, in the waste gas stream from the smelt reduction vessel without causing undesirable caking and deposits on the vessel openings and in the following ducts. The solution described in the patent is to keep the iron droplets entrained in the waste gas stream in the waste gas ducts at a temperature higher than the solidification temperature of the iron droplets and then to cool the waste gas to under 1000° C. in a separate space.

The present invention is concerned with providing a process for producing metals and metal alloys, in particular iron and iron alloys, from metal oxides and ores, such as iron ore, including partly prereduced ores and metal oxide-containing slags, in a smelt reduction vessel, that makes it possible to separate from the waste gas before the waste gas leaves the vessel a high proportion of the liquid and solids present in the waste gas in the space above the bath surface of the smelt reduction vessel in order to reduce the loss of the liquid and solids in the waste gas stream leaving the smelt reduction vessel, and thereby improve the economy of the smelt reduction process for producing metals and metal alloys, in particular iron and iron alloys.

The subject of the invention is a process for producing metals and metal alloys, in particular iron and iron alloys, from metal oxides and/or ores, such as iron ore, including partly prereduced ores and metal oxide-containing slags, in a smelt reduction vessel containing molten metal into which the metal oxides and/or ores are supplied in fine-grained form, and carbonaceous fuels and oxidizing gases, such as oxygen, air and oxygen-containing gases, and optionally slag forming agents, are additionally directed into the molten metal-below and/or from above the bath surface, and waste gases formed in the vessel are discharged through an outlet, that is characterized in that loss of liquid and solids through the waste gases outlet is reduced by causing the waste gases, oxidizing gases, liquid and solids in a space above the bath surface to rotate about a vertical axis of the vessel thereby forcing liquid and solids outwardly toward the wall of the vessel.

The subject of the invention is also a process for producing metals and metal alloys, in particular iron and iron alloys, from metal oxides and/or ores, such as iron ore, including partly prereduced ores and metal oxide-containing slags, in a smelt reduction vessel containing molten metal into which the metal oxides and/or ores are supplied in fine-grained form, and carbonaceous fuels and oxidizing gases, such as oxygen, air and oxygen-containing gases, and optionally slag forming agents, are additionally directed into the molten metal below and/or from above the bath surface, and waste gases formed in the vessel are discharged through an outlet, that is characterized in that loss of liquid and solids through the waste gases outlet is reduced by causing the waste gases, oxidizing gases, liquid and solids in a space above the bath surface to rotate about a vertical axis of the vessel thereby forcing liquid and solids outwardly toward the wall of the vessel, and in that fine-grained ores and/or other metal oxides, which may also be partly prereduced, are supplied directly to the molten metal from above the bath surface.

The subject of the invention is also a smelt reduction vessel for producing metals and metal alloys, in particular iron and iron:alloys, from metal oxides and/or ores, the smelt reduction vessel comprising tuyeres below the bath surface, top blowing tuyeres and/or lances above the bath surface, and an outlet for waste gases, that is characterized in that the vessel has a substantially rotationally symmetrical shape at least in the space above the bath surface.

FIG. 1 discloses a smelt reduction vessel in accordance with one aspect of the invention.

An essential feature of the invention is that the axis of rotation of the waste gases, oxidizing gases, liquid and solids in the space above the bath surface is perpendicular to the bath surface. Such a flow pattern differs clearly from the flow pattern produced by the known processes in smelt reduction vessels. In the prior art smelt reduction processes the oxidizing gases are usually blown onto the bath surface perpendicular thereto or at small angles of inclination to the vertical. The waste gases produced flow upwardly towards the top blowing jet and are partly entrained by the top blowing jet and are consequently directed downwardly towards the bath surface. The resultant flow pattern within the space above the bath surface is about a horizontal axis of rotation, ie parallel to the bath surface.

The gas atmosphere in the space above the bath surface is oxidizing. If preheated air is used as an oxidizing gas for afterburning, the atmosphere consists substantially of the reaction gases leaving the molten metal, mainly CO and $H_2$, the afterburned gases $CO_2$ and $H_2O$ and the nitrogen of the air. A typical gas composition is shown by the following analysis: 16% CO, 10% $CO_2$, 4% $H_2$, 10% $H_2O$ and 60% $N_2$.

There is a turbulent transition zone between the bath surface (and the layer of slag floating thereon) and the space above the bath surface. In the transition zone there are ascending droplets or splashes of molten metal and slag which mix with reaction gases from the melt, the top blown oxidizing gases, and the reaction gases from the afterburning. It is thought that the volumes of gas and liquid are more or less evenly distributed in the transition zone.

The height of the transition zone can be controlled within certain limits by adjusting the ratio of the reacting agents blown onto the bath surface and the reaction agents injected into the melt below the bath surface. For example, the height of the transition zone can be increased by increasing the ratio, ie by increasing the mass of the reacting agents introduced onto the molten metal relative to that of the reacting agents added through the tuyeres below the bath surface. The droplets and splashes of molten metal and slag (and dust) move from the transition zone into the space thereabove, and the relatively small droplets and splashes are held there in suspension by strong turbulent gas flow in the space, and the larger droplets and splashes fall back into the bath due to gravity.

The load of liquid and solids in the space above the bath surface varies greatly and depends on the operating mode of the iron bath reactor. The process of the invention permits the reacting agents necessary for operating the process to be added below and/or above the bath surface. For example, all solids, such as carbonaceous fuels, metal oxides and/or ores, prereduced ores, and the slag forming agents, with carrier gases, such as nitrogen, argon, CO, $CO_2$ or recycled dedusted reaction gases from the smelt reduction vessel, can be directed into the molten metal through tuyeres below the bath surface. In addition, a part of the oxidizing gases, e.g. oxygen, can be introduced into the melt below the bath surface. It has been found that when the metal bath reactor is operated in this fashion, with all of the solids and about 30% of the oxidizing gases being supplied to the molten metal below the bath surface, the mass of liquids and solids in the space above the bath surface increases with the height of the transition zone.

The discharge of liquid and solids into the space above the bath surface can be reduced in the inventive process by changing the manner of supplying the reacting agents. It has thus proven useful to introduce the carbonaceous fuels and slag forming agents into the molten metal below the bath surface and to blow the oxidizing gases onto the bath surface. The ore can be supplied in fine-grained form also below the bath surface.

It has surprisingly been found to be a particularly advantageous embodiment of the inventive process to blow fine-grained ore and/or partly prereduced ore, also in extremely fine grain size fractions, directly onto the bath surface. This way of supplying the ore from tuyeres or lances above the bath surface results in lower dust loading rates in the waste gases compared with supply of ore below the bath surface. It is also within the scope of the invention to supply the metal oxides or ores to the molten metal below and above the bath surface simultaneously.

According to a preferred embodiment of the invention the oxidizing gases, such as oxygen, air, oxygen-containing gases and any mixtures thereof, are blown towards the bath surface obliquely to a vertical plane through a vertical axis of the vessel.

In a particularly preferred embodiment of the invention at least a part of the oxidizing gases are blown towards the bath surface through a tuyere positioned at an angle of inclination of between 10° and 80° to each of two mutually perpendicular vertical imaginary planes. The spacial location of the direction of the oxidizing gases and the vertical planes is explained hereinafter. Starting with a vertical plane in a radial direction through the physical location of a tuyere, the first angle of inclination is that angle which the axis of the tuyere describes with the vertical in this radial plane. The second plane is perpendicular to the radial plane along the vertical axis of the smelt reduction vessel. The second angle of inclination is the angle that the axis of the tuyere describes with this second plane. In effect, the position of the tuyere may be described by imagining the axis of the tuyere in the first radial plane being rotated towards the vessel wall.

The directions of top blowing the oxidizing gases according to the preferred embodiments of the invention described in the preceding paragraphs are selected so that the top blown oxidizing gases rotate and also impart a rotational motion to the waste gases, liquid and solids in the space above the bath surface. The rotational motion occurs even though the space above the bath surface under usual conditions is subject to a flow pattern in the direction of the waste gases outlet that is strongly turbulent in view of the high reaction rates and the enormous energy transfer in a smelt reduction vessel. The energy transfer density, ie the maximum energy transfer divided by the minimal geometrical dimensions, is known to be very high in smelt reduction processes compared to other metallurgical processes, typically in the range of about 1 $MW/m^3$.

The rotational motion in the space above the bath surface surprisingly leads to unpredictable favourable results with respect to the loss of liquid and solids through the waste gases outlet from the smelt reduction vessel. While the usual dust loading rates of the waste gases from the smelt reduction vessel are about 40 $g/Nm^3$. waste gases, this value was reduced by the inventive process to less than 10 $g/Nm^3$ waste gases, in many cases to less than 5 $g/Nm^3$ and in an iron bath reactor for several hours of operation to about 1 $g/Nm^3$.

A conceivable explanation for this favourable effect of the inventive process is that the superposition of the rotational motion on the strong turbulent motion normally present in the space above the bath surface of the smelt reduction vessel produces a flow pattern that increases the collision frequency of the solids and liquid in the space and the solids and liquid are accelerated by centrifugal force towards the vessel wall. The collisions cause liquid and solids to agglomerate to form coarser particles and a proportion of these coarser particles fall back into the melt. The remaining coarser particles and the fine solids and liquid that reach the vessel wall stick thereto and thereby reduce the proportion of liquid and solids in the waste gas.

An advantageous embodiment of the invention is to blow the oxidizing gases into the space above the bath surface with a swirl obliquely to a vertical plane through a vertical axis of the vessel. The swirl of the oxidizing gases contributes further to increasing the rotational motion and improving the flow pattern in the space and promotes afterburning of the reaction gases from the molten metal. It has proven to be advantageous to employ the process and apparatus according to German patent no 39 03 705 in connection with this embodiment of the inventive process.

A determination of the waste gas speeds in the inventive process has shown that the waste gases leave the smelt reduction vessel through the waste gas outlet at a speed of about 10 to 150 m/sec. When the inventive process was employed in an iron bath reactor, measurements of the waste gas speed at the outlet yielded mean values of about 80 m/sec.

The mean speed of the rotational motion in the space above the bath surface according to the invention has been estimated to be between 2 and 50 m/sec. It is noted that it is preferred that the mean speed is between 2 and 15 m/sec.

According to the invention the smelt reduction vessel comprises a top blowing means, such as tuyeres and/or lances, disposed obliquely to a vertical plane through a vertical axis of the vessel which may also be perpendicular to the bath surface, and at least 0.5 m above the static bath surface, and, in one possible inventive arrangement, point tangentially towards the bath surface. The top blowing means, comprising one or more tuyeres or a lance, deliver all finely ground solids, such as ores and/or metal oxides, partly prereduced ores and slag forming agents and carbonaceous fuels to the molten metal. It is within the scope of the invention to blow the fine-grained metal ores and/or partly prereduced metal ores into the smelt reduction vessel in preheated form. The preheating temperatures can be selected as required and are usually between 300° to 800° C. The energy introduced by preheating the solids improves the total thermal efficiency of the process.

The smelt reduction vessel of the invention further comprises tuyeres below the bath surface, an outlet port for waste gases and tap holes for molten metal and slag. It has proved advantageous for the inventive process if the geometrical shape of the metal bath reactor, in particular in the area above the bath surface, is rotationally symmetrical. However, this advantageous shape is not a precondition for applying the inventive process. It is merely a recommended vessel shape.

It is also preferred that the smelt reduction vessel comprises a sufficiently large space above the metal surface. It has proven favourable for the height of the space to be at least twice the depth of the molten metal. A value of 2 to 10 times, preferably 3 to 6 times, the depth of the molten metal is particularly preferred.

The inventive process and the smelt reduction vessel is now explained in more detail in the following with reference to the accompanying drawing which shows a longitudinal section in simplified and schematic form of a preferred embodiment of a smelt reduction vessel.

The vessel 1 comprises a sheet steel jacket lined on the inside with refractory bricks. The vessel 1 contains molten metal 2 with a layer of slag floating thereon. Finely-ground solids with a carrier gas and gaseous reacting agents are supplied to melt 2 via bottom tuyeres 3 shown as arrows. The tuyeres 3 are usually constructed of two concentric pipes, the reacting agents preferably being directed through the central pipe, and gaseous tuyere protectant, usually hydrocarbons such as natural gas or propane, flowing through the annular gap between the two pipes. Inert gases such as nitrogen or argon can also be used as tuyere protectants.

Top blowing means 4 are also shown by arrows. Spiral-shaped arrows 5 indicate the swirl of the oxidizing gases blown through tuyeres 4 onto the bath surface. Arrow 6 symbolizes the rotating gas flow. According to the invention it is irrelevant whether the gas flow rotates to the left or to the right.

The liquid and solids in the space above the molten metal 2 are accelerated by centrifugal forces in the direction toward inner vessel wall 8.

The vessel 1 further comprises a conical shape 9 in the upper region thereof to retain large splashes of the molten metal in the vessel 1.

The vessel 1 further comprises a waste gas port 10 through which waste gas indicated by arrow 11 leaves the metal bath reactor.

The drawing does not show trunnions for rotating the vessel 1 into a horizontal position from the operating position shown. In this horizontal position all tuyeres 3 and 4 are then located above the bath zone.

We claim:

1. A process for producing metals and/or metal alloys by reducing metal oxides and/or ores, including partly prereduced ores and metal oxide-containing slags, in a smelt reduction vessel having a vertical axis, said smelt reduction vessel comprising a wall, said wall having a waste gas outlet, and a molten metal bath, said method comprising the steps of:

(a) supplying metal oxides and/or ores in fine-grained form into said smelt reduction vessel to form metals and/or metal alloys, (b) supplying a coreactant selected from the group consisting of carbonaceous fuels and oxidizing gases, slag forming agents, and mixtures thereof into the molten metal bath below and/or from above the bath surface, (c) forming metals and/or metal alloys and a waste gas from said metal oxides and/or ores and coreactants introduced into said molten metal bath said waste gases comprising a material selected from the group consisting of gases, solids, liquids, and mixtures thereof, (d) imparting rotational motion to the waste gases, oxidizing gases, liquids and solids in a space above the bath surface about said vertical axis of the vessel thereby forcing liquid and solids outwardly toward said vessel wall, said rotational motion imparted by injecting at least a part of said oxidizing gases into said smelt reduction vessel towards said molten bath on an angle which is oblique in relationship to the vertical axis of said vessel, (e) discharging said waste gases from the vessel through the outlet, wherein the dust loading rate from the molten metal bath through the outlet is reduced to less than 10 g/Nm$^3$.

2. The process of claim 1, wherein the rotational motion of the waste gases, oxidizing gases, liquids and solids in said vessel is caused by injecting at least a part of the oxidizing gases into said vessel through a tuyere positioned at a first angle of inclination to a radial plane extending from the vertical axis of said vessel intersecting the tuyere and a second angle of inclination to a plane perpendicular to the radial plane and intersecting the radial plane along the vertical axis of the vessel, the first angle of inclination being the angle that the axis of the tuyere describes with the vertical in the radial plane, and the second angle of inclination being the angle that the axis of the tuyere describes with the second plane.

3. The process of claim 2 characterized in that the first and second angles of inclination are 10° to 80°.

4. The process of claim 3, characterized in that the first and second angles of inclination are 10° to 60°.

5. The process of claim 1, characterized in that the oxidizing gases are blown into the space above the bath surface with a swirl.

6. The process of claim 1, characterized in that a mean speed of the rotational motion in the space is between 2 and 50 m/sec.

7. The process of claim 1, characterized in that the waste gases are discharged from the vessel through the waste gases outlet at a speed of between 10 and 150 m/sec.

8. A process for producing metals and metal alloys by reducing metal oxides and/or ores, including partly prereduced ores and metal oxide-containing slags, in a smelt reduction vessel, said smelt reduction vessel comprising a wall, said wall having a waste gas outlet, said smelt reduction vessel containing a molten metal bath, said method comprising the steps of:

(a) supplying metal oxides and/or ores to said vessel in fine-grained form to form metals and/or metal alloys, (b) supplying a coreactant selected from the group consisting of carbonaceous fuels oxidizing gases, and slag forming agents, and mixtures thereof directed into the molten metal bath below and/or from above the bath surface, (c) forming metals and/or metal alloys and a waste gas from said metal oxides and/or ores and coreactants introduced into said molten metal bath, said waste gases comprising a material selected from the group consisting of a gas, a solid, a liquid and mixtures thereof, (d) imparting rotational motion to the waste gases, oxidizing gases, liquid and solids in a space above the bath surface about said vertical axis of the vessel thereby forcing liquid and solids outwardly toward said vessel wall, said rotational motion imparted by injecting at least a part of said oxidizing gases into said smelt reduction vessel towards said molten bath on an angle which is oblique in relationship to the vertical axis of said vessel, (e) discharging said waste gases formed in the vessel through the outlet, wherein the dust loading rate from the molten metal bath through the outlet is reduced to less than about 10 g/Nm$^3$.

9. The process of claim 8, characterized in that the fine-grained metal ores and/or partly prereduced metal ores are preheated.

* * * * *